United States Patent
Anbai

(10) Patent No.: US 8,443,236 B2
(45) Date of Patent: May 14, 2013

(54) TEST APPARATUS FOR TESTING AN INFORMATION PROCESSING APPARATUS

(75) Inventor: Toshihisa Anbai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 12/409,471

(22) Filed: Mar. 23, 2009

(65) Prior Publication Data

US 2009/0240984 A1 Sep. 24, 2009

(30) Foreign Application Priority Data

Mar. 24, 2008 (JP) ................................. 2008-076390

(51) Int. Cl.
*G06F 11/00* (2006.01)

(52) U.S. Cl.
USPC .............................................. 714/43; 714/25

(58) Field of Classification Search .................... 714/25, 714/43

See application file for complete search history.

(56) References Cited

U.S. PATENT DOCUMENTS

| | | | | |
|---|---|---|---|---|
| 5,229,990 | A | * | 7/1993 | Teraslinna ..................... 370/218 |
| 5,301,050 | A | * | 4/1994 | Czerwiec et al. .............. 398/30 |
| 5,473,752 | A | * | 12/1995 | Beistle et al. .................. 714/4.1 |
| 5,596,569 | A | * | 1/1997 | Madonna et al. .............. 370/217 |
| 6,034,948 | A | | 3/2000 | Nakamura et al. |
| 6,950,968 | B1 | * | 9/2005 | Parolari et al. .................. 714/43 |
| 7,003,690 | B2 | * | 2/2006 | Liva et al. ....................... 714/4.2 |
| 7,047,459 | B2 | * | 5/2006 | Chuah et al. .................. 714/716 |
| 7,100,092 | B2 | * | 8/2006 | Allred et al. .................... 714/43 |
| 7,301,327 | B1 | * | 11/2007 | Sabih et al. ................. 324/750.3 |
| 7,496,657 | B2 | * | 2/2009 | Menon .......................... 709/224 |
| 2002/0133756 | A1 | * | 9/2002 | Jain ................................. 714/43 |
| 2003/0120984 | A1 | * | 6/2003 | Chuah et al. .................. 714/716 |
| 2004/0078717 | A1 | * | 4/2004 | Allred et al. .................... 714/43 |

FOREIGN PATENT DOCUMENTS

| | | |
|---|---|---|
| JP | 61-231646 | 10/1986 |
| JP | 5-204807 A | 8/1993 |
| JP | 09-200209 | 7/1999 |
| JP | 2000-285036 | 10/2000 |
| JP | 2002-16664 A | 1/2002 |

OTHER PUBLICATIONS

Notice of Reasons for Refusal dated Dec. 4, 2012, from corresponding Japanese application No. 2008-076390 with partial translation.

* cited by examiner

*Primary Examiner* — Yolanda L Wilson
(74) *Attorney, Agent, or Firm* — Fujitsu Patent Center

(57) ABSTRACT

A test apparatus for testing an information processing apparatus includes a control unit connected to the control signal line through the connector unit to receive command information from the processing unit to execute the program, and a switching unit connected to the control unit to connect the second communication signal line and the fourth communication signal line under the control of the control unit.

19 Claims, 6 Drawing Sheets

TEST APPARATUS FOR TESTING AN INFORMATION PROCESSING APPARATUS

CROSS-REFERENCE TO RELATED APPLICATIONS

This application is based upon and claims priority to prior Japanese Patent Application No. 2008-76390 filed on Mar. 24, 2008 in the Japan Patent Office, the entire contents of which are incorporated herein by reference.

FIELD

An embodiment of the invention discussed herein relates to a test apparatus, an information processing system and a test method.

BACKGROUND

In the conventional method of fabricating an SVP (Service Processor) board in a factory, a yield of fabricated SVP boards is checked. The yield is checked by confirming an operation of, for example, a CPU (Central Processing Unit), a HUB, and an I2C (Inter-Integrated Circuit, a standard on an inter-IC bidirectional serial bus developed by Philips) controller mounted on the SVP board.

Normally, the yield of SVP boards is checked by conducting a test utilizing the I2C function. With regard to an SVP board having no element having the I2C function, however, the test cannot be conducted utilizing the I2C function.

If the test may not be conducted utilizing the I2C function, the operator conducts the test by a simple method in which a voltage is applied to the SVP board by contact with a terminal and a resulting output voltage confirmed thereby to check the yield of the SVP board.

A technique for conducting an online loopback test has been disclosed. Also, a technique has been disclosed to conduct a connection test between end systems without installing a test program in the end systems.

[Patent Document 1] Japanese Laid-open Patent Publication No. 2002-16664
[Patent Document 2] Japanese Laid-open Patent Publication No. 5-204807

SUMMARY

According to an aspect of the invention, a test apparatus for testing an information processing apparatus includes a control unit connected to the control signal line through the connector unit to receive the command information from the processing unit to execute the program, and a switching unit connected to the control unit to connect the second communication signal line and the fourth communication signal line under the control of the control unit.

DESCRIPTION OF EMBODIMENTS

The test apparatus, the information processing system and the test method according to a preferred embodiment of the invention will be explained below with reference to the accompanying drawings.

First Embodiment

Figure 1:
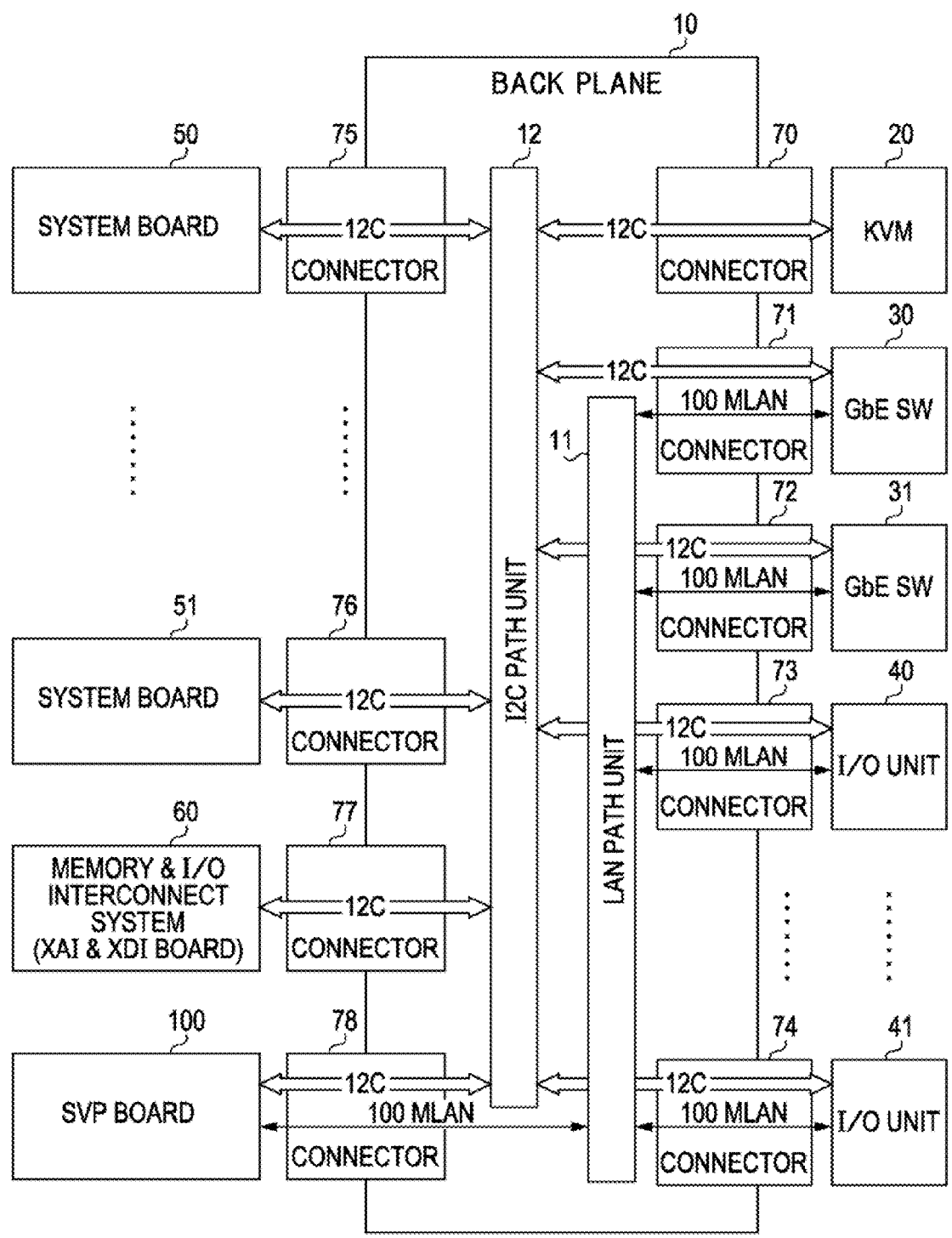
FIG. 1 is a diagram depicting an example of the configuration of a backplane 10.

First, the configuration of the backplane of the server constituting an information processing apparatus carrying the SVP board according to this embodiment will be explained. FIG. 1 is a diagram depicting an example of the configuration of the backplane 10. As depicted in FIG. 1, the backplane 10, having a LAN path unit 11 and an I2C path unit 12, is connected to connectors 70 to 78.

The connector 70 is connected to a KVM (Keyboard, Video, and Mouse) interface 20. Also, the connectors 71 and 72 are connected to GbE switches 30 and 31, respectively. The connectors 73 and 74 are connected to I/O units 40 and 41, respectively. Further, the connectors 75 and 76 are connected to system boards 50 and 51, respectively. The connector 77 is connected to a memory & I/O interconnect system (XAI & XDI board) 60, and the connector 78 to an SVP board 100.

In the example depicted in FIG. 1, the LAN path unit 11 controls the boards including the GbE switches 30, 31, the I/O units 40, 41, and the SVP board 100 by a LAN (local area network) and also constitute a communication path. The I2C path unit 12, on the other hand, controls the boards (the KVM 20, the GbE switches 30, 31, the I/O units 40, 41, the system boards 50, 51, the memory & I/O interconnect system 60 and the SVP board 100 depicted in FIG. 1) through the I2C buses and also constitutes a communication path.

The I2C buses are each an inter-IC bidirectional serial bus developed by Philips. The I2C bus signal line includes a serial clock line (SCL) and a serial data line (SDA). Using these two lines and the I2C buses, the communication is conducted between the control side (master) and the IC side (slave). The data transfer through the I2C buses is started by a start condition and ended by a stop condition.

Figure 2:
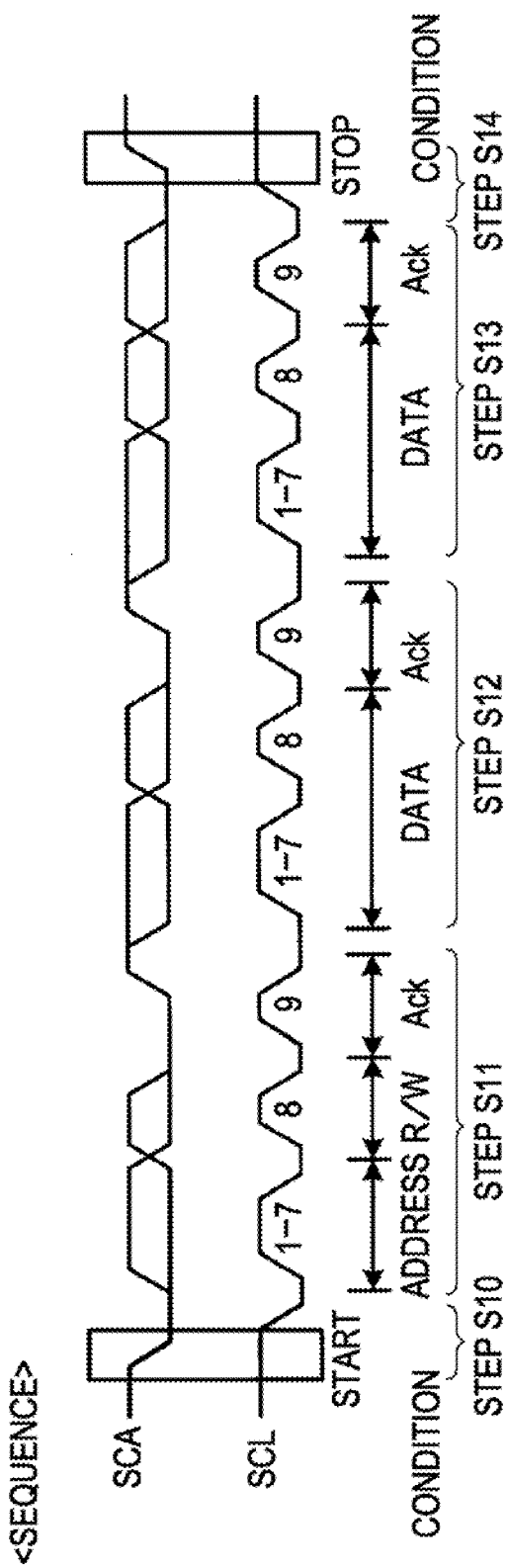
FIG. 2 is a diagram for explaining the I2C sequence.

FIG. 2 is a diagram for explaining the data transfer sequence along each I2C bus. Before starting the data transfer, as depicted in FIG. 2, the master issues the start condition and acquires the right to use the I2C bus, after which the data is transferred (step S10).

Then, the device address is transmitted, the read/write operation is controlled, and the ACK (acknowledgment) from the slave is received by the master (step S11). Next, the master receives the memory address in the device and the ACK from the slave (step S12).

The data transfer is started by the master, and the ACK is received from the slave (step S13). Upon complete data transfer, the master issues the stop condition to release the bus (step S14).

Returning to FIG. 1, the KVM 20 is a device functioning as an interface with various input devices (for example, the keyboard and the mouse not depicted). The GbE switches 30 and 31 are connected to the communication path meeting the Gigabit Ethernet (registered trademark) standard to switch the paths thus connected.

The I/O units 40 and 41 are devices connected to the LAN card for communication through the LAN. Only the I/O units 40 and 41 are depicted for the convenience of explanation. Nevertheless, the backplane 10 may be equipped with other I/O units.

The system boards 50 and 51 are devices carrying a CPU, a memory and the like to execute a specific process assigned to them. The system boards 50 and 51 execute the input/output process using the I/O unit 40 or 41. For example, the system board 50 executes the input/output process by conducting the communication using the I/O unit 40 while the system board 51 executes the input/output process by conducting the communication using the I/O unit 41. Although only the system boards 50 and 51 are depicted by way of explanation, the backplane 10 may also include other system boards.

The memory & I/O interconnect system 60 is a device to store information on the relation between the system board and the I/O unit. The memory & I/O interconnect system 60, for example, stores information indicating that the system board 50 utilizes the I/O unit 40 and the system board 51 utilizes the I/O unit 41. The SVP board 100 will be explained below.

Figure 3:
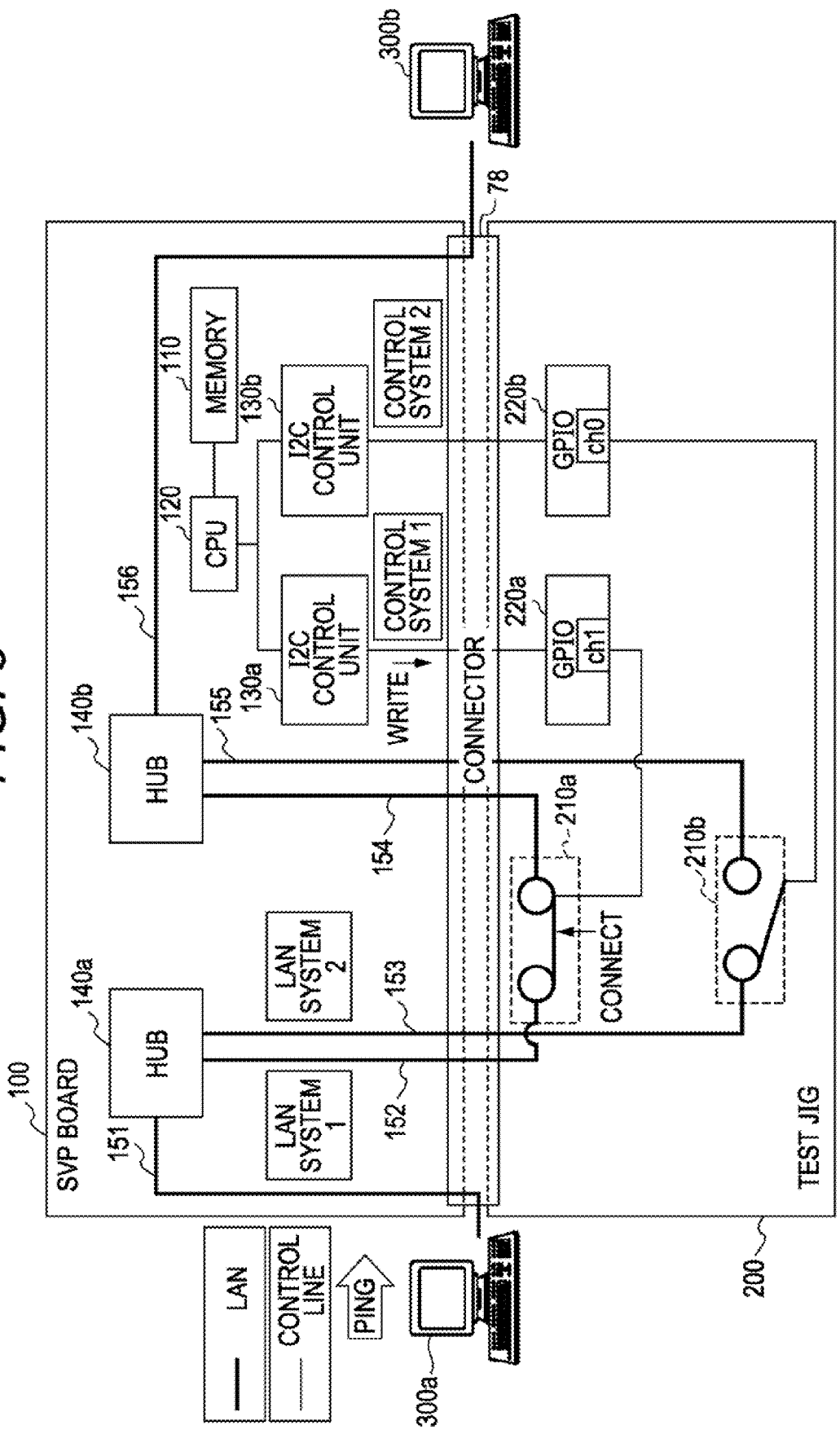
FIG. 3 is a function block diagram depicting an SVP configuration according to an embodiment of the invention.

The SVP board 100 is a device for executing the various control operations in the server by reading a program. The SVP board 100, for example, conducts a diagnostic test on the server autonomously. FIG. 3 is a function block diagram depicting the configuration of the SVP board according to this embodiment. As depicted in FIG. 3, the SVP board 100 includes a memory 110, a CPU 120, I2C control units 130a, 130b, and HUBs 140a and 140b.

Also, the SVP board 100 is connected to a test jig 200 and terminal units 300a and 300b by a connector 78. As depicted in FIG. 3, the test jig 200 includes relays 210a, 210b, and GPIOs (general-purpose I/Os) 220a and 220b. The other parts of the configuration are similar to those of a typical SVP board and therefore not explained.

The memory 110 is a storage unit to store the data and the programs needed for the various processes executed by the CPU 120. The memory 110 stores, for example, the test program for conducting the self-diagnostic test. The procedure of the test program will be explained later with reference to a flowchart.

The CPU 120 is an arithmetic operation unit for executing the various processes by reading the programs stored in the memory 110 as a storage unit. Especially, the CPU 120 conducts the self-diagnostic test of the SVP board 100 by reading the test program from the memory 110.

The I2C control units 130a and 130b are each connected to the CPU 120 through a control line. The I2C control units 130a and 130b are devices to open/close the relays 210a and 210b by writing a value of "0" or "1" in the channel held by the GPIOs 220a and 220b upon receipt of an open/close instruction for the relays 210a and 210b from the CPU 120.

The I2C control unit 130a, upon reception of an instruction from the CPU 120 to close the relay 210a, closes the relay 210a by writing a value of "1" in channel ch1 of the GPIO 220a. By closing the relay 210a, the LAN 152 and the LAN 154 are connected to each other.

Upon reception of an instruction from the CPU 120 to open the relay 210a, on the other hand, the I2C control unit 130a opens the relay 210a by writing a value of "0" in channel ch1 of the GPIO 220a. By opening the relay 210a, the LAN 152 and the LAN 154 are disconnected from each other.

The I2C control unit 130b, upon reception of an instruction from the CPU 120 to close the relay 210b, closes the relay 210b by writing a value of "1" in channel ch0 of the GPIO 220b. By closing the relay 210b, the LAN 153 and the LAN 155 are connected.

Upon reception of an instruction from the CPU 120 to open the relay 210b, on the other hand, the I2C control unit 130b opens the relay 210b by writing a value of "0" in channel ch0 of the GPIO 220a. By opening the relay 210b, the LAN 153 and the LAN 155 are disconnected from each other.

The HUBs 140a and 140b are devices for connecting the LANs. The HUB 140a is connected to the LANs 151 to 153. The HUB 140a is also connected to the terminal unit 300a through the LAN 151. Further, the HUB 140a is connected to the relays 210a and 210b through the LANs 152 and 153.

The HUB 140b is connected to the LANs 154 to 156. The HUB 140b is also connected to the terminal unit 300b through the LAN 156. Further, the HUB 140b is connected to the relays 210a and 210b through the LANs 154 and 155.

The GPIO 220a is connected to the I2C control unit 130a through the connector 78 via a control line. Also, the GPIO 220a closes the relay 210a when a value of "1" is written in channel ch1 by the I2C control unit 130a. On the other hand, the GPIO 220a opens the relay 210a when a value of "0" is written in channel ch1.

The GPIO 220b, on the other hand, is connected to the I2C control unit 130b through the connector 78 and a control line. Also, the GPIO 220b closes the relay 210b when a value of "1" is written in channel ch2 by the I2C control unit 130b. The GPIO 220b opens the relay 210b when "0" is written in channel ch2.

The relay 210a is connected to the GPIO 220a through the control line, and in response as an acknowledgement to an instruction from the GPIO 220a, connects or disconnects the LANs 152 and 154. The relay 210b, on the other hand, is connected to the GPIO 220b through the control line, and in response as an acknowledgement to an instruction from the GPIO 220b, connects or disconnects the LANs 153 and 155.

Next, the process of the CPU 120 to execute the test program will be explained. A case to test a control system #1, a LAN system #1, a control system #2, and a LAN system #2 shall be considered as an example. The control system #1 includes the I2C control unit 130a, the GPIO 220a, the relay 210a, and a control line. The LAN system #1 includes the LANs 152 and 154. Also, the control system #2 includes the I2C control unit 130b, the GPIO 220b, the relay 210b, and a control line. Further, the LAN system #2 includes the LANs 153 and 155.

(Test on Control System #1 and LAN System #1)

The CPU 120 controls the I2C control unit 130a to write "1" in channel ch1 of the GPIO 220a thereby to close the relay 210a and connect the LANs 152 and 154.

If the relay 210a fails to be closed in the process, the CPU 120 judges that a fault has occurred in the control system #1. Then, the CPU 120 stores in the memory 110 the information indicating that a fault has occurred in the control system #1, while at the same time adding a value of "1" to the number of errors. The initial value of the number of errors may be 0.

If the relay 210a is closed, on the other hand, the CPU 120 displays, on a display (not depicted in FIG. 3) or the like, information indicating that the relay 210a is closed, and switches to a standby state waiting for the input of the completion confirmation by the operator. The operator accessing the display operates the terminal unit 300a and transmits to the terminal unit 300b a ping signal indicating that the communication of the network in the LAN system #1 is confirmed.

Upon completion of the transmission of the ping signal from the terminal unit 300a to the terminal unit 300b, the operator inputs the information indicating that the confirmation is complete, through an input unit (not depicted), and notifies the CPU 120.

The CPU 120, having received the notification from the operator that the confirmation is completed, controls the I2C control unit 130*a* to write a value of "0" in channel ch1 of the GPIO 220*a*, and by opening the relay 210*a*, disconnects the LANs 152 and 154.

The CPU 120, on the other hand, upon failure to receive the information indicating that the confirmation is complete from the operator for longer than a specific time, stores in the memory 110 the information indicating that a fault has occurred in the LAN system #1, while at the same time adding 1 to the number of errors. Then, the CPU 120 controls the I2C control unit 130*a* to write a value of "0" in channel ch1 of the GPIO 220*a*, and by opening the relay 210*a*, disconnects the LANs 152 and 154.

(Test of Control System #2 and LAN System #2)

The CPU 120 controls the I2C control unit 130*b* to write "1" in channel ch0 of the GPIO 220*b*. By thus closing the relay 210*b*, the LANs 153 and 155 are connected to each other.

If the relay 210*b* fails to be closed in the process, the CPU 120 judges that the control system #2 has developed a fault. The CPU 120 stores in the memory 110 the information indicating that the control system #2 has developed a fault, while at the same time adding 1 to the number of errors.

If the relay 210*b* is closed, on the other hand, the CPU 120 displays on a display (not depicted) the information indicating that the relay 210*b* is closed, and switches to the standby mode to wait for the input of a completion confirmation by the operator. The operator accessing the display operates the terminal unit 300*a*, and transmits to the terminal unit 300*b* a ping signal indicating that the network communication in the LAN system #2 is confirmed.

When the ping signal transmission is completed from the terminal unit 300*a* to the terminal unit 300*b*, the operator inputs, through an input unit (not depicted), the information indicating that the confirmation is complete and notifies the CPU 120.

The CPU 120, upon reception of the information indicating that the confirmation is complete from the operator, controls the I2C control unit 130*b* to write "0" in channel ch0 of the GPIO 220*b*, and by thus opening the relay 210*b*, disconnects the LANs 153 and 155.

If the CPU 120 fails to receive the information on the completion confirmation from the operator for longer than a specific time, on the other hand, the information indicating that the LAN system #2 has developed a fault is stored in the memory 110, while at the same time 1 is added to the number of errors. Then, the CPU 120 controls the I2C control unit 130*b* to write "0" in channel ch0 of the GPIO 220*b*, and by thus opening the relay 210*b*, disconnects the LANs 153 and 155.

Upon completion of the test on the control system #1 and the LAN system #1 and the test on the control system #2 and the LAN system #2, if any one of the control systems #1 and 2 and/or the LAN systems #1 and 2 has developed a fault, the information on the system which has developed the fault, which is stored in the memory 110, is displayed on a display or the like If any one of the control systems #1 and 2 and/or the LAN systems #1 and 2 has developed a fault (the number of errors is 1 or more), the operator can confirm the point of the error.

If neither the control systems #1 and 2 nor the LAN systems #1 and 2 has developed a fault (the number of errors is 0), on the other hand, the CPU 120 erases the test program stored in the memory 110 by writing in the memory 110 a program for a product registered in advance. In other words, the CPU 120 writes the product program or the like over the test program.

Figure 4:
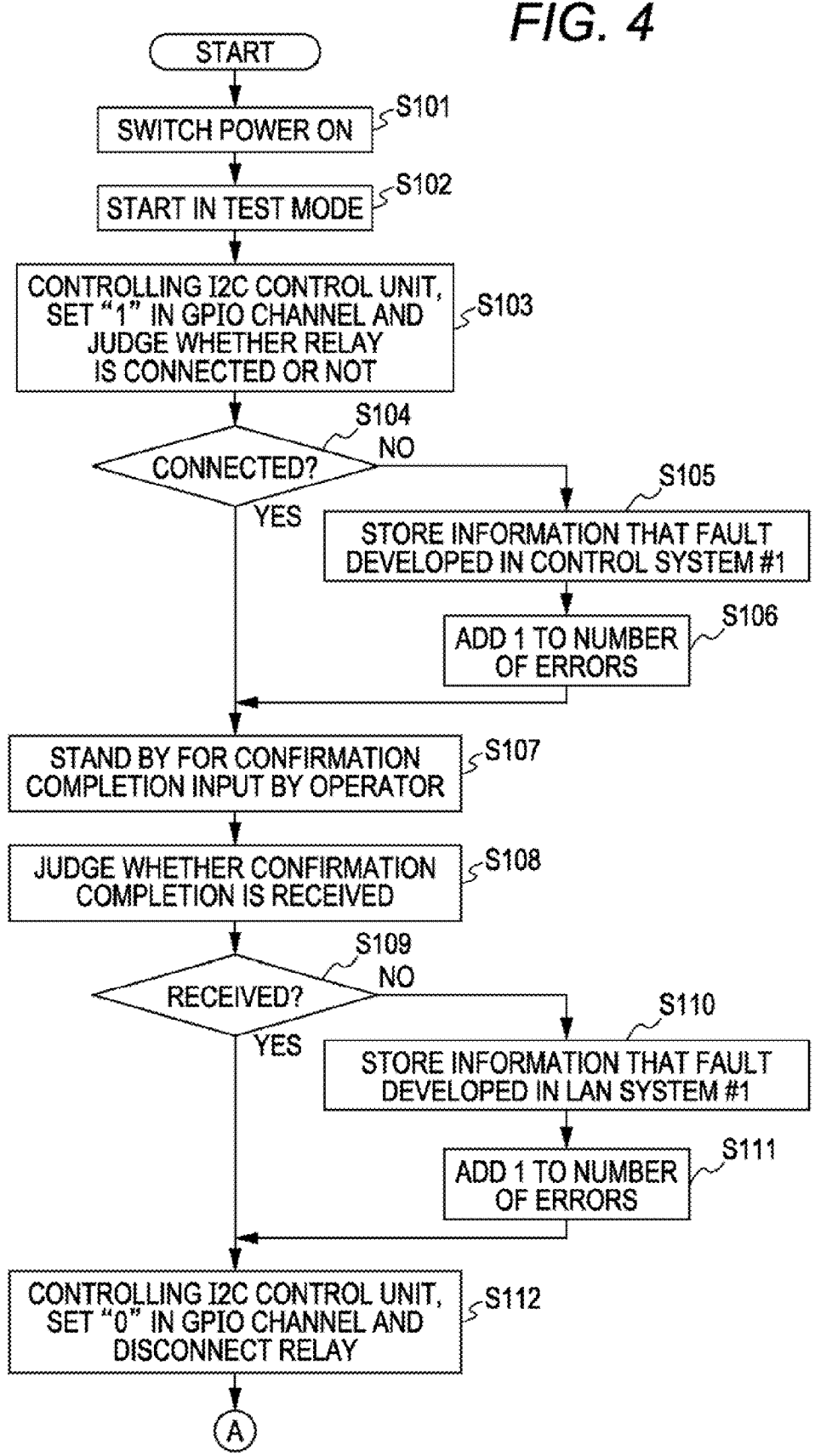
FIG. 4 is a first flowchart depicting the steps of the process executed by the test jig and the SVP board according to the embodiment.
Figure 5:
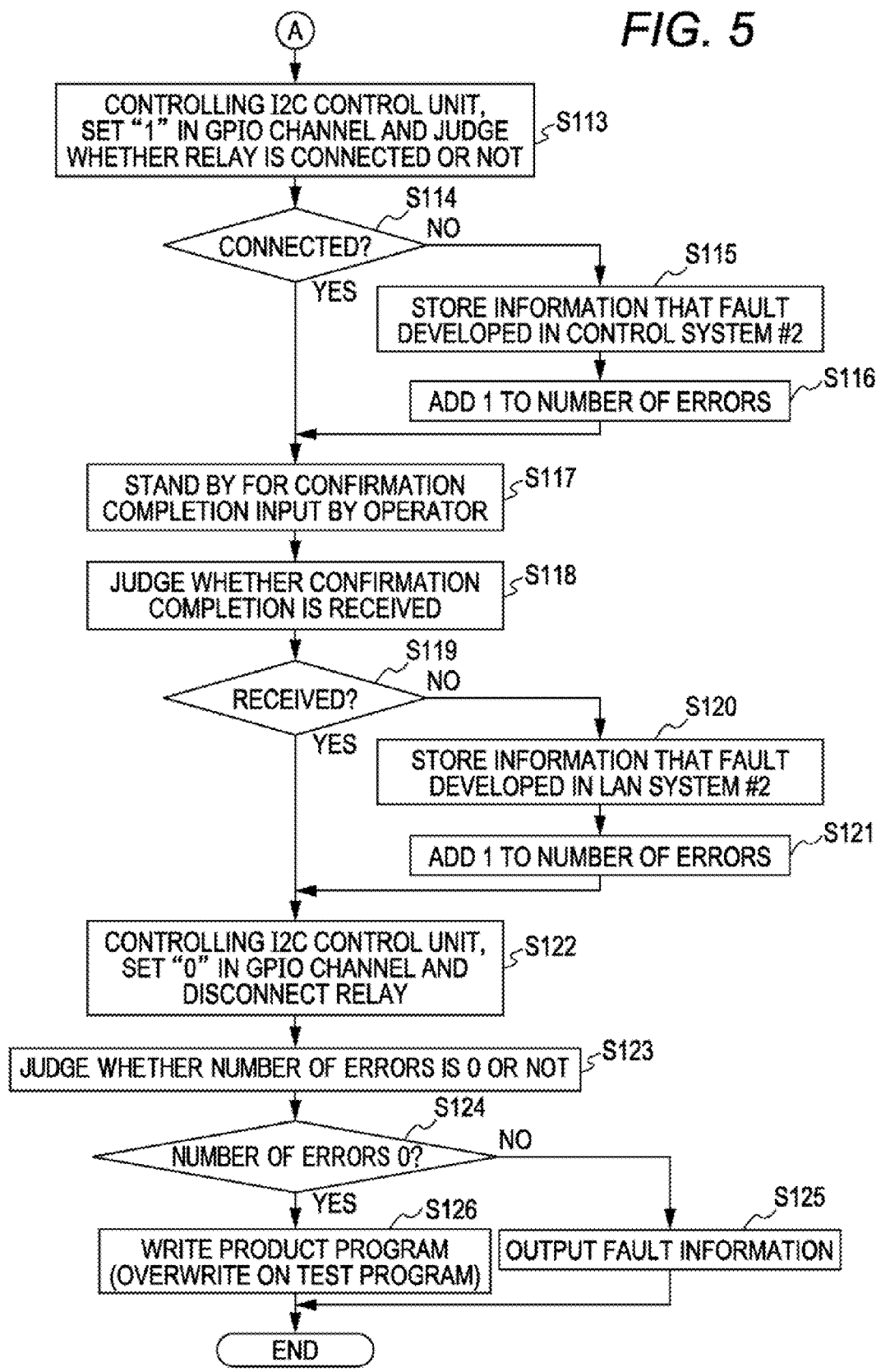
FIG. 5 is a second flowchart depicting the continuing steps of the process following the first flowchart depicted in the FIG. 4, and the steps of the process is executed by the test jig and the SVP board according to the embodiment.

Next, the steps of the process executed by the SVP board 100 and the test jig 200 according to this embodiment will be explained. FIGS. 4 and 5 are flowcharts depicting the steps of the process executed by the SVP board 100 and the test jig 200 according to this embodiment.

As depicted in FIGS. 4 and 5, by switching on power of the SVP board 100 (test jig 200) (step S101), the test mode is started (step S102). The CPU 120 controls the I2C control unit 130*a* to set "1" in channel ch1 of the GPIO 220*a* to judge whether the relay 210*a* is connected or not (step S103).

If the relay 210*a* is not connected (NO in step S104), the CPU 120 stores in the memory 110 the information indicating that the control system #1 has developed a fault (step S105), while at the same time adding 1 to the number of errors (step S106). The process then proceeds to step S107.

If the relay 210*a* is connected (YES in step S104), on the other hand, the CPU 120 switches to the standby mode to wait for the input of the completion confirmation by the operator (step S107) while at the same time judging whether the completion confirmation has been received from the operator or not (step S108).

If the completion of confirmation is not received from the operator (NO in step S109), the CPU 120 stores in the memory 110 the information indicating that the LAN system #1 has developed a fault (step S110), while at the same time adding 1 to the number of errors (step S111). Then the process proceeds to step S112.

If the completion of confirmation is received from the operator (YES in step S109), on the other hand, the CPU 120 controls the I2C control unit 130*a* to set "0" in channel ch1 of the GPIO 220*a* and disconnects the relay 210*a* (step S112).

Then, the CPU 120 controls the I2C control unit 130*b* to set "1" in channel ch1 of the GPIO 220*b* and judges whether the relay 210*b* is connected or not (step S113).

If the relay 210*b* is not connected (NO in step S114), the CPU 120 stores in the memory 110 the information indicating that the control system #2 has developed a fault (step S115), while at the same time adding 1 to the number of errors (step S116). The process then proceeds to step S117.

If the relay 210*b* is connected (YES in step S114), on the other hand, the CPU 120 switches to the standby mode to wait for input of the confirmation completion by the operator (step S117) and judges whether the confirmation of completion from the operator has been received or not (step S118).

If no confirmation of completion is received from the operator (NO in step S119), the CPU 120 stores in the memory 110 the information indicating that the LAN system #2 has developed a fault (step S120), while at the same time adding 1 to the number of errors (step S121). The process then proceeds to step S122.

The CPU 120, upon reception of confirmation of completion from the operator (YES in step S119), on the other hand, controls the I2C control unit 130*b* to set "0" in channel ch0 of the GPIO 220*b* and disconnects the relay 210*b* (step S122).

Then, the CPU 120 judges whether the number of errors is 0 or not (step S123), and if the number of errors is not 0 (NO in step S124), outputs the fault information stored in the memory 110 (step S125 If the number of errors is 0, on the other hand, the CPU 120 writes the product program in the memory 110 (step S126).

In this way, the CPU 120 reads the test program stored in the memory 110, and autonomously conducts the self-diagnostic test by opening/closing the relays 210a and 210b, thereby reducing the burden on the operator.

Figure 6:
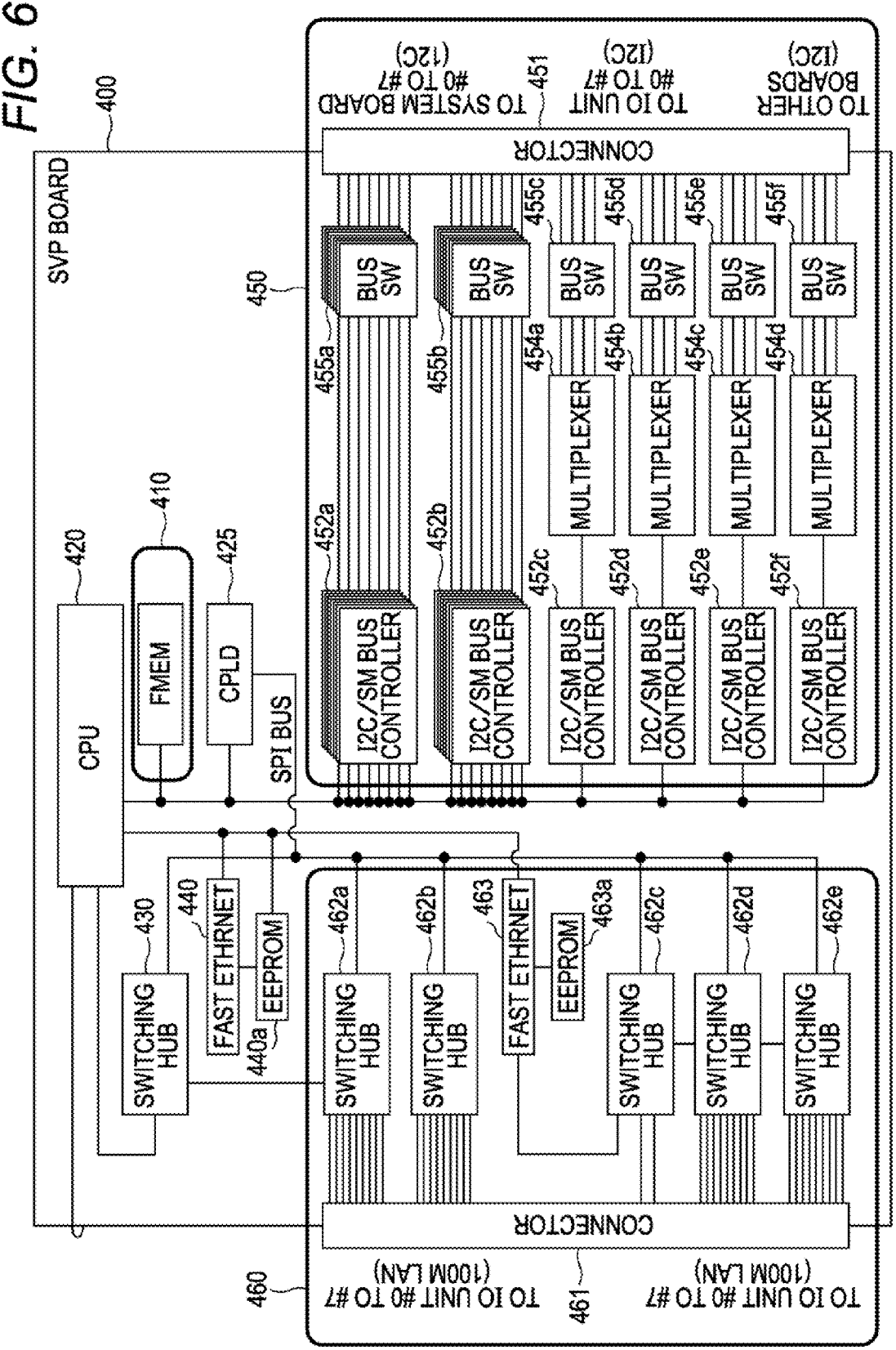
FIG. 6 is a diagram depicting the hardware configuration corresponding to the SVP board.

Next, an example of the hardware configuration of the SVP board 100 depicted in FIG. 3 will be explained. FIG. 6 is a diagram depicting the hardware configuration corresponding to the SVP board 100. As depicted in FIG. 6, the SVP board 400 includes an FMEM (flash memory) 410, a CPU 420, a CPLD (complex programmable logic device) 425, a switching HUB 430, a Fast Ethernet (registered trademark) 440, an EEPROM (Electrically Erasable Programmable Read-Only Memory) 440a, an I2C system 450, and a LAN system 460. The other parts of the configuration are similar to those of a typical SVP board and thus shall not be explained.

The FMEM 410 is a storage unit corresponding to the memory 110 depicted in FIG. 3, and the CPU 420 is an arithmetic operation unit corresponding to the CPU 120 depicted in FIG. 3. The CPLD 425 outputs various control signals to the LAN system 460.

The switching HUB 430 is a hub for connecting the CPU 420 and the LAN system 460. Also, the Fast Ethernet (registered trademark) 440 selects the main one of various Ethernets (registered trademark). The EEPROM 440a stores various information used by the Fast Ethernet (registered trademark) 440.

The I2C system 450 corresponds to the control systems #1 and #2 and includes a connector 451, I2C/SMBus controllers 452a to 452f, multiplexers 454a to 454d, and bus switches 455a to 455f. Also, the I2C system 450 is connected with the CPU 420 through a control line.

The connector 451 corresponds to the connector 78 depicted in FIGS. 1 and 3. Also, the I2C/SMBus controllers 452a to 452f correspond to the I2C control units 130a and 130b depicted in FIG. 3.

The multiplexers 454a to 454d connect the I2C/SMBus controllers 452a to 452f and the bus switches 455c to 455f. Also, the bus switches 455a to 455f switch the connected bus.

The LAN system 460 corresponding to the LAN systems #1 and #2 depicted in FIG. 3 includes a connector 461, switching HUBs 462a to 462e, a Fast Ethernet (registered trademark) 463, and an EEPROM 463a. The connector 461, the switching HUBs 462a to 462e, the Fast Ethernet (registered trademark) 463, and the EEPROM 463a are each connected to the CPU 420 through a control line.

The connector 461 corresponds to the connector 78 depicted in FIGS. 1 and 3. Also, the switching HUBs 462a to 462e correspond to the HUBs 140a and 140b depicted in FIG. 3. The Fast Ethernet (registered trademark) 463 selects the main one of the various Ethernets (registered trademark). The EEPROM 463a stores the various information used by the Fast Ethernet (registered trademark) 463.

As described above, in the SVP board 100 (400) according to this embodiment, the GPIOs 220a and 220b are connected to the CPU 120 through the I2C control units 130a and 130b by way of the connector 78 and the control line. The CPU 120 controls the GPIOs 220a and 220b to open/close the relays 210a and 210b based on the test program stored in the memory 110. According to this embodiment, therefore, the diagnostic test time of the SVP board 100 is simplified and automated, thereby reducing the burden on the operator.

Of all the processes described above as automatic ones in this embodiment, the whole or a part of the processes can be alternatively executed manually, or conversely, the whole or a part of the manual processes described above can alternatively be executed automatically by a well-known method. Further, the processing steps, the control procedure, the specific names and the information including the various data and parameters described herein above and the accompanying drawings can be arbitrarily modified unless otherwise specified.

Each component element of the SVP boards 100 and 400 depicted in FIGS. 3 and 6 is a conceptual function and do not need to be configured physically as depicted. The specific form of distribution or integration of each device is not limited to those depicted in the drawings, but the whole or a part thereof can be functionally or physically distributed or integrated in arbitrary units in accordance with the various loads and operating conditions.

What is claimed is:

1. An apparatus used in a test for testing an information processing apparatus, the apparatus comprising:
a connector connected to the information processing apparatus including a storage device, processor connected to the storage device and transmits command information to an external device through a control signal line, a first relay device connected to a first communication device through a first communication signal line and to the connector through a second communication signal line, and a second relay device connected to a second communication device through a third communication signal line and to the connector through a fourth communication signal line;
a switch connected to the connector, and connected to the second communication signal line through the connector and the fourth communication signal line through the connector; and
a controller connected to the control signal line through the connector and configured to receive the command information for controlling the switch from the processor;
wherein the switch connects or disconnects a connection between the second communication signal line and the fourth communication signal line under the control of the controller.

2. The apparatus according to claim 1, wherein
when the switch connects the second communication signal line and the fourth communication signal line, the test is performed by transmitting a connection confirmation request from the first communication device to the second communication device through the first relay device, the second communication signal line, the switch, the fourth communication signal line and the second relay device, and transmitting a connection confirmation acknowledgement from the second communication device that has received the connection confirmation request, to the first communication device through the second relay device, the fourth communication signal line, the switch, the second communication signal line and the first relay device.

3. The apparatus according to claim 1, wherein the processor writes a fault information to the storage device when the switch does not connect in response to the command information for connecting the second communication signal line and the fourth communication signal line.

4. The apparatus according to claim 3, wherein the processor performs a program for the test in storage device and erases the program when the fault information is not stored in the storage device.

5. The apparatus according to claim 4, wherein the processor erases the program by writing a product program over the program in the storage device.

6. An apparatus used in a test for testing an information processing apparatus, the apparatus comprising:
a connector connected to the information processing apparatus including a storage device, a processor connected to the storage device and transmitting command information through a first control signal line and a second control signal line, a first relay device connected to a first communication device through a first communication signal line and to the connector through a second communication signal line and a third communication signal line, and a second relay device connected to a second communication device through a fourth communication signal line, and to the connector through a fifth communication signal line and a sixth communication signal line;

a first controller connected to the first control signal line and configured to receive first command information from the processor;

a second controller connected to the second control signal line and to receive second command information from the processor;

a first switch connected to the first controller and to the second communication signal line and the fifth communication signal line through the connector, and connects or disconnects a connection between the second communication signal line and the fifth communication signal line under the control of the first controller; and a second switch connected to the second controller and to the third communication signal line and the sixth communication signal line, and connects or disconnects a connection between the third communication signal line and the sixth communication signal line under the control of the second controller.

7. The apparatus according to claim 6,
wherein when the first switch connects the second communication signal line and the fifth communication signal line, the test is performed by transmitting a connection confirmation request from the first communication device to the second communication device through the first relay device, the first switch and the second relay device, and transmitting a connection confirmation acknowledgement from the second communication device that has received the connection confirmation request, to the first communication device through the second relay device, the first switch and the first relay device, and when the second switch connects the third communication signal line and the sixth communication signal line, the test is performed by transmitting a connection confirmation request from the first communication device to the second communication device through the first relay device, the second switch and the second relay device.

8. The apparatus according to claim 6, wherein the processor writes a fault information to the storage device when the switch does not connect in response to the command information for connecting the second communication signal line and the fifth communication signal line or for connecting the third communication signal line and the sixth communication signal line.

9. The apparatus according to claim 8, wherein the processor performs a program for the test in storage device and erases the program when the fault information is not stored in the storage device.

10. The apparatus according to claim 9, wherein the processor erases the program by writing a product program over the program in the storage device.

11. A system comprising:
an information processing apparatus including
a storage device,
a processor connected to the storage device and transmitting command information through a control signal line,
a first relay device connected to a first communication device through a first communication signal line, and
a second relay device connected to a second communication device through a third communication signal line; and
an apparatus including
a connector connected to the information processing apparatus,
a controller connected to the processor through the control signal line and adapted to receive the command information through the control signal line from the processor, and
a switch connected to the controller,
wherein the first relay device is connected to the apparatus through a second communication signal line,
the second relay device is connected to the apparatus through a fourth communication signal line, and
the switch is connected to the first relay device through the second communication signal line and to the second relay device through the fourth communication signal line, and connects or disconnects a connection between the first relay device and the second relay device under the control of the controller.

12. The system according to claim 11,
wherein the test is operated in such a manner that
the switch connects the second communication signal line and the fourth communication signal line,
transmits a connection confirmation request from the first communication device to the second communication device through the first relay device, the switch and the second relay device, and
transmits a connection confirmation response from the second communication device that has received the connection confirmation request to the first communication device through the second relay device, the switch and the first relay device.

13. The system according to claim 11, wherein the processor writes a fault information to the storage device when the switch does not connect in response to the command information for connecting the first relay device and the second relay device.

14. The system according to claim 13, wherein the processor performs a program for the test in storage device and erases the program when the fault information is not stored in the storage device.

15. The system according to claim 14, wherein the processor erases the program by writing a product program over the program in the storage device.

16. A test method for an information processing apparatus, the method comprising:
connecting the information processing apparatus including a storage device, a processor connected to the storage device and transmitting command information through a control signal line, a first relay device connected to a first communication signal line to communicate with a first communication device and to a second communication signal line, and a second relay device connected to a third communication signal line to communicate with a second communication device and to a fourth communication signal line and an apparatus including a controller and a switch so as to connect the control unit to the control signal line and to connect the switch to the first relay device through the second communication signal line and to the second relay device through the fourth communication signal line;

outputting the command information from the processor to the controller to control the switch;

outputting a control signal from the controller that has received the command information to the switch;

connecting by the switch the second communication signal line and the fourth communication signal line under the control of the control signal from the controller;

transmitting a connection confirmation request from the first communication device to the second communication device through the first relay device, the switch and the second relay device; and transmitting a connection confirmation acknowledgement for the connection confirmation request from the second communication device to the first communication device through the second relay device, the switch and the first relay device.

17. The test method according to claim 16, wherein the test method is performed by a program in storage device, the test method further comprises:

writing a fault information to the storage device when the connecting by the switch does not connect in response to the command information for connecting the second communication signal line and the fourth communication signal line, and erasing the program when the fault information is not stored in the storage device.

18. A test method for an information processing apparatus, the method comprising:

connecting the information processing apparatus including a storage device, a processor connected to the storage device and transmitting command information to an external device through a control signal line, a first relay device connected to a first communication device through a first communication signal line, and is connected to a second communication signal line and a third communication signal line, and a second relay device connected to a second communication device through a fourth communication signal line, and to a fifth communication signal line and a sixth communication signal line and an apparatus including a first control device, a second control device, a first switch and a second switch, so as to connect the first control device to the processor through the first control signal line, to connect the second control device through the second control signal line, to connect the first switch to the second communication signal line and to the fifth communication signal line, and to connect the second switch to the third communication signal line and to the sixth communication signal line;

receiving, by the first controller, first command information through the first control signal line from the processor;

connecting, by the first switch, the second communication signal line and the fifth communication signal line under the control of the first controller;

communicating between the first communication device and the second communication device through the first relay device, the first switch and the second relay device;

disconnecting, by the first switch, the second communication signal line and the fifth communication signal line under the control of the first controller;

receiving, by the second controller, second command information through the second control signal line from the processor;

connecting, by the second switch, the third communication signal line and the sixth communication signal line under the control of the second controller; and communicating between the first communication device and the second communication device through the first relay device, the second switch and the first relay device.

19. The test method according to claim 18, wherein the test method is performed by a program in storage device, the test method further comprises:

writing a fault information to the storage device when the connecting by the first switch does not connect in response to the command information for connecting the second communication signal line and the fifth communication signal line, and erasing the program when the fault information is not stored in the storage device.

* * * * *